(12) United States Patent
Hu et al.

(10) Patent No.: US 9,791,911 B2
(45) Date of Patent: Oct. 17, 2017

(54) DETERMINING WHETHER A CHANGE IN POWER USAGE IS ABNORMAL WHEN POWER USAGE EXCEEDS A THRESHOLD BASED ON ADDITIONAL METRICS OF COMPONENTS IN AN ELECTRONIC DEVICE

(71) Applicant: Chiun Mai Communication Systems, Inc., New Taipei (TW)

(72) Inventors: Chia-Jung Hu, New Taipei (TW); Kai-Hsi Yang, New Taipei (TW); Tai-Chuan Chen, New Taipei (TW); Li-Bin Shen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/966,734

(22) Filed: Dec. 11, 2015

(65) Prior Publication Data

US 2016/0179168 A1 Jun. 23, 2016

(30) Foreign Application Priority Data

Dec. 18, 2014 (CN) .......................... 2014 1 0802693

(51) Int. Cl.
  *G06F 1/32* (2006.01)
(52) U.S. Cl.
  CPC ................................ *G06F 1/3206* (2013.01)

(58) Field of Classification Search
None
See application file for complete search history.

(56) References Cited

U.S. PATENT DOCUMENTS

| | | | | |
|---|---|---|---|---|
| 2005/0240786 A1* | 10/2005 | Ranganathan | ........ | G06F 1/3215 713/320 |
| 2006/0005097 A1* | 1/2006 | Ichikawa | .............. | G06F 9/5088 714/745 |
| 2013/0110424 A1* | 5/2013 | Nagathil | .............. | H04B 17/327 702/62 |
| 2013/0179973 A1* | 7/2013 | Du | .......................... | G06F 21/81 726/24 |
| 2015/0025857 A1* | 1/2015 | Arsovski | ............. | G06F 17/5045 703/2 |

* cited by examiner

*Primary Examiner* — Kim Huynh
*Assistant Examiner* — Danny Chan
(74) *Attorney, Agent, or Firm* — Steven Reiss

(57) ABSTRACT

In a method for detecting power usages of an electronic device, parameters of components of the electronic device and a power usage of the electronic device are obtained within a predetermined $N^{th}$ period. The electronic device determines if the power usage of the electronic device is normal according to the parameters of components of the electronic device within the $N^{th}$ period. The electronic device records information of applications which run in the electronic device within the $N^{th}$ period when the power usage of the electronic device is abnormal.

14 Claims, 5 Drawing Sheets

| No. | 1 | 2 | 3 | 4 | 5 | 6 | 7 | 8 |
|---|---|---|---|---|---|---|---|---|
| CPU temperature (Celsius degree) | 50 | 50 | 52 | 52 | 54 | 54 | 54 | 51 |
| WIFI throughput (MB) | 5 | 4 | 0 | 0 | 4 | 5.8 | 6 | 9 |
| WIFI change count | 3 | 8 | 0 | 0 | 13 | 12 | 14 | 9 |
| 3G throughput (MB) | 0 | 0 | 5 | 5.8 | 0 | 0 | 0 | 0 |
| 3G change count | 0 | 0 | 8 | 8 | 0 | 0 | 0 | 0 |
| Power usage (mA) | 25 | 26 | 27 | 28 | 30 | 47 | 32 | 35 |

FIG. 3

| No. | Data set | Mark |
|---|---|---|
| 1 | (25;50,5,3,0,0) | |
| 2 | (26;50,4,8,0,0) | |
| 3 | (27;52,5,8,0,0) | |
| 4 | (28;52,5.6,8,0,0) | |
| 5 | (30;54,4,13,0,0) | |
| 6 | (47;54,5.8,12,0,0) | Error value |
| 7 | (32;54,6,14,0,0) | |
| 8 | (35;51,9,9,0,0) | |

FIG. 4

DETERMINING WHETHER A CHANGE IN POWER USAGE IS ABNORMAL WHEN POWER USAGE EXCEEDS A THRESHOLD BASED ON ADDITIONAL METRICS OF COMPONENTS IN AN ELECTRONIC DEVICE

CROSS-REFERENCE TO RELAYED APPLICATIONS

This application claims priority to Chinese Patent Application No. 201410802693.6 filed on Dec. 18, 2014, the contents of which are incorporated by reference herein.

FIELD

Embodiments of the present disclosure relate to network technology, and particularly to an electronic device and a method for detecting a power usage of an electronic device.

BACKGROUND

With the development of an electronic device (for example, a smart phone, or a tablet computer), applications (for example, a music application, a social network application, a news application or the like) can be configured to run on the electronic device. The applications which run on the electronic device result in the electronic device consuming power which can be provided by a battery of the electronic device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 3 shows a diagrammatic view of an example of parameters of components of the electronic device within various periods.

FIG. 4 shows a diagrammatic view of an example of a data set of a power usage of the electronic device.

DETAILED DESCRIPTION

Figure 1:
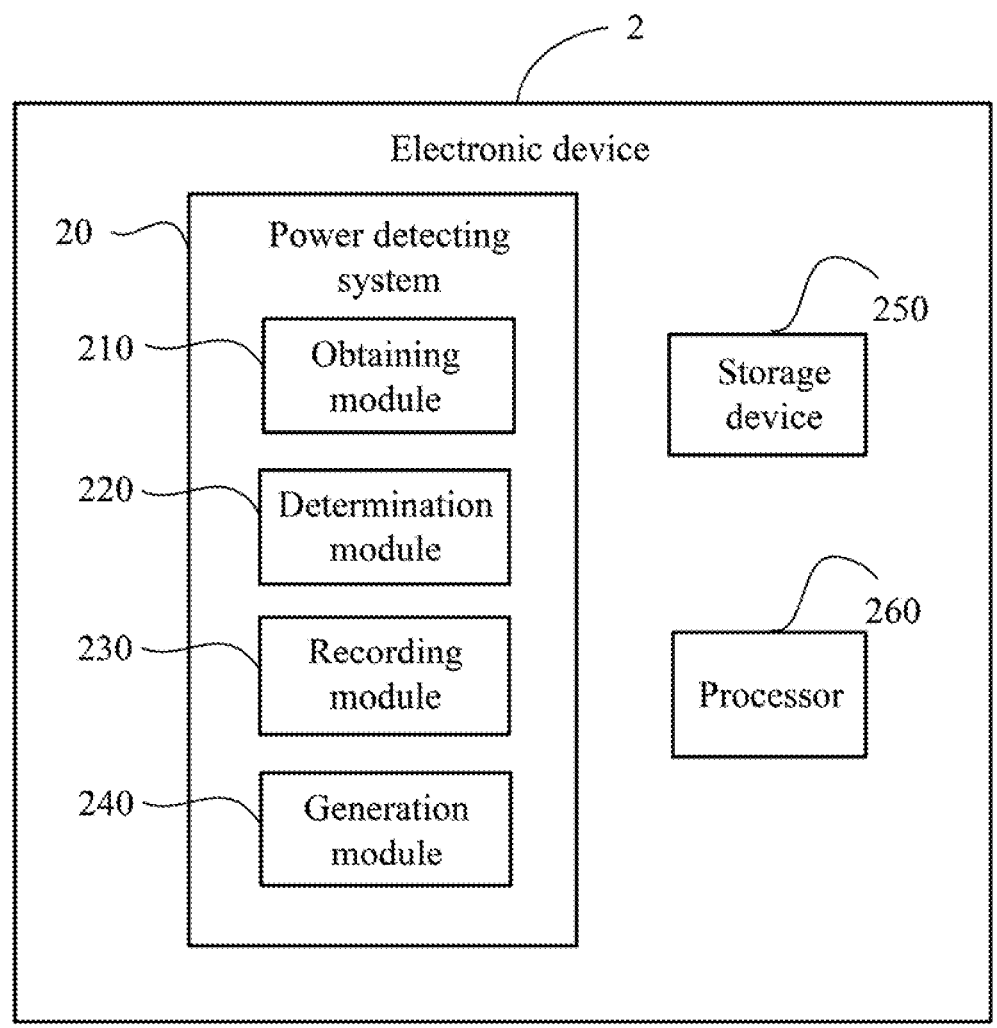
FIG. 1 is a block diagram of one embodiment of a power detecting system in an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 is a block diagram of one embodiment of a power detecting system 20 in an electronic device 2. The electronic device 2 includes, but is not limited to, a power detecting system 20, a storage device 250, and at least one processor 260. FIG. 1 illustrates only one example of the electronic device 2, and other examples can comprise more or fewer components that those shown in the embodiment, or have a different configuration of the various components. The electronic device 2 can be, but is not limited to, a mobile phone, a tablet computer, a personal digital assistant (PDA), a personal computer or any other electronic devices which provide functions of network connections.

In at least one embodiment, the storage device 250 can be an internal storage device, such as a flash memory, a random access memory (RAM) for temporary storage of parameters, and/or a read-only memory (ROM) for permanent storage of parameters. The storage device 250 can also be an external storage device, such as an external hard disk, a storage card, or a data storage medium. The at least one processor 260 can be a central processing unit (CPU), a microprocessor, or other data processor chip that performs functions of the electronic device 2.

The power detecting system 20 comprises, but is not limited to, an obtaining module 210, a determination module 220, a recording module 230, and a generation module 240. Modules 210-240 can comprise computerized instructions in the form of one or more computer-readable programs that can be stored in a non-transitory computer-readable medium, for example the storage device 250, and executed by the at least one processor 260 of the electronic device 2. A detailed description of the functions of the modules 210-240 is given below in reference to FIG. 2.

Figure 2:
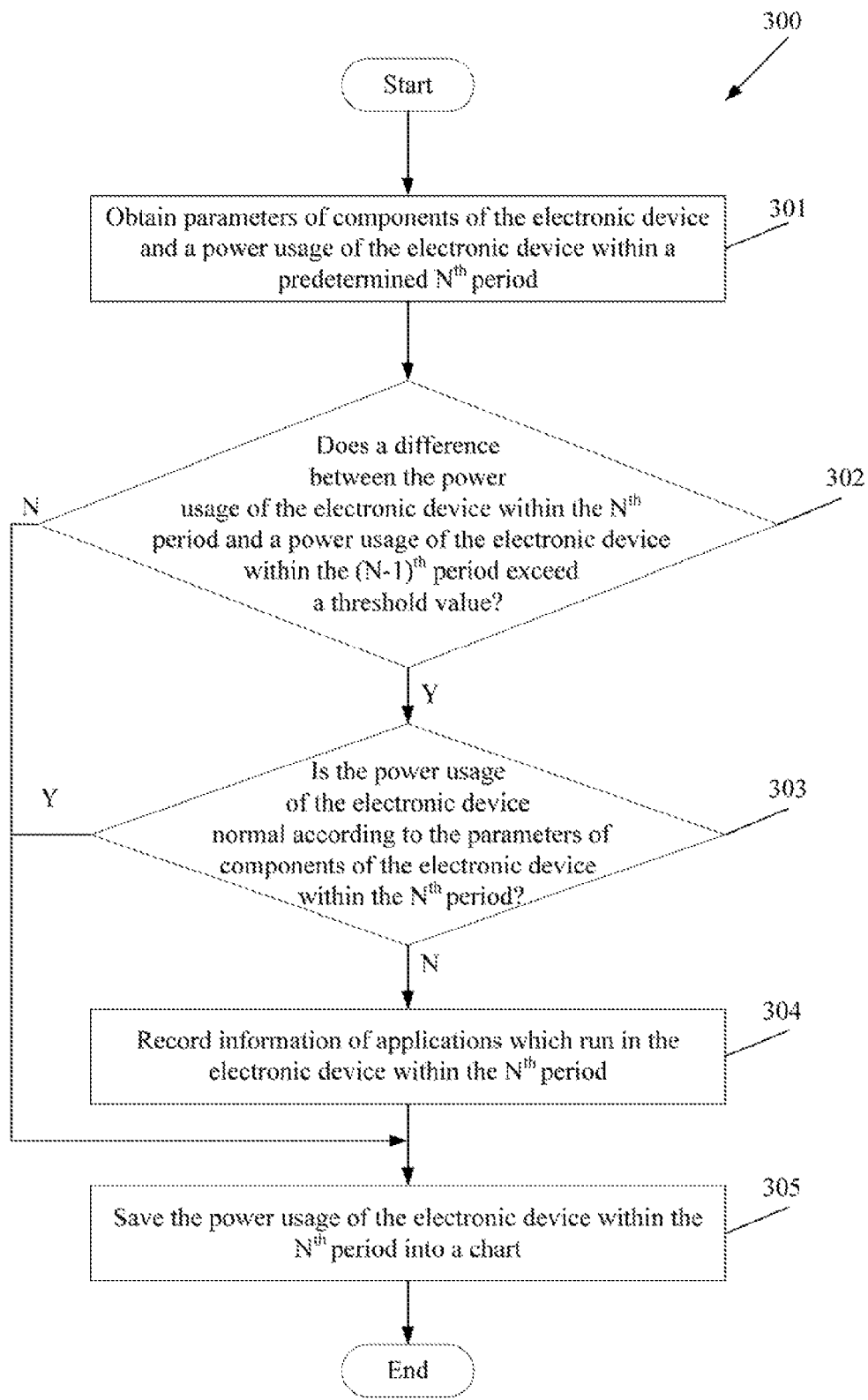
FIG. 2 is a flowchart of an example embodiment of a method for detecting a power usage of the electronic device.

FIG. 2 illustrates a flowchart of an example embodiment of a method for detecting a power usage of an electronic device. In an example embodiment, the method is performed by execution of computer-readable software program codes or instructions by at least one processor of the electronic device.

Referring to FIG. 2, a flowchart is presented in accordance with an example embodiment. The method 300 is provided by way of example, as there are a variety of ways to carry out the method. The method 300 described below can be carried out using the configurations illustrated in FIG. 1, for example, and various elements of these figures are referenced in explaining method 300. Each block shown in FIG. 2 represents one or more processes, methods, or subroutines, carried out in the method 300. Furthermore, the illustrated order of blocks is illustrative only and the order of the blocks can be changed. Additional blocks can be added or fewer blocks can be utilized without departing from this disclosure. The example method 300 can begin at block 301.

At block 301, an obtaining module obtains parameters of components of the electronic device 2 and a power usage of the electronic device 2 within a predetermined $N^{th}$ period, for example, the eight periods. N is a positive integer. In at least one embodiment, the component of the electronic device can be, but are not limited to a, central processing unit (CPU), a screen, a WIFI device, a communication device (for example, a 2G 3G or 4G communication device,) or the like. The parameters of components of the electronic device 2 includes a temperature value and a CPU usage of the electronic device, a running time of the screen, a throughput of the WIFI device, a change count of the WIFI device, a throughput of the communication device, and a change count of the communication device. In detail, the electronic device includes an operating system. The parameters of components of the electronic device 2 and the power usage of the electronic device 2 are detected by an operating system and saved into a log file. The obtaining module obtains parameters of components of the electronic device 2 and the power usage of the electronic device 2 from the log file. In addition, a predetermined detection time (for example, two hours starting from 14:00 PM to 16:00 PM) is equally or unequally divided into N periods (for example, eight periods). For example, the eighth period starts from 15:45 PM to 16:00 PM, the obtaining module obtains the parameters of components of the electronic device 2 and the power usage of the electronic device 2 within a tenth period starting from 15:45 PM to 16:00 PM.

At block 302, a determination module determines if a difference between the power usage of the electronic device 2 within the $N^{th}$ period and a power usage of the electronic device within a $(N-1)^{th}$ period exceeds a threshold value. For example, the power usage of the electronic device 2 within the eight period starting from 15:40 PM to 16:00 PM is 35 milliampere (mA), and the power usage of the electronic device 2 within the seventh period starting from 15:30 PM to 15:45 PM is 32 mA, the difference is 3 mA. The threshold value is set by a user, and the threshold value can be, but is not limited to, five mA, ten mA, fifteen mA or the like. If the difference between the power usage of the electronic device 2 within the Nth period and the power usage of the electronic device 2 within the $(N-1)^{th}$ period does not exceed the threshold value, the procedure goes to block 305. Otherwise, the difference between the power usage of the electronic device 2 within the $N^{th}$ period and the power usage of the electronic device 2 within the $(N-1)^{th}$ period exceeds a threshold value, the procedure goes to block 303.

At block 303, the determination module determines if the power usage of the electronic device is normal according to the parameters of components of the electronic device 2 within the $N^{th}$ period. In at least one embodiment, if the power usage of the electronic device 2 is normal, the procedure goes to block 305. Otherwise, if the power usage of the electronic device 2 is abnormal, the procedure goes to block 304.

In at least one embodiment, the power usage of the electronic device 2 is abnormal when Br is less than Pr, where Br is a difference between the running time of the screen within the $N^{th}$ period and the running time of the screen within the $(N-1)^{th}$ period, Pr is the difference between the power usage of the electronic device 2 within the $N^{th}$ period and the power usage of the electronic device 2 within the $(N-1)^{th}$ period.

In at least another embodiment, each component is assigned with a weight factor for determining whether the power usage of the electronic device 2 is normal or abnormal. The weight factor indicates a relation between a change value of parameters of each component and a change value of the power usage of the electronic device 2. The relation between the change value of parameters of each component and the change value of the power usage of the electronic device 2 can be linear, for example, Y=AX+B, where Y is the change value of the power usage of the electronic device 2, X is the change value of parameters of each component (for example, a CPU), A is a weight factor, and B is a constant value (for example, zero). For example, if the weight factor is equal to "1", and the power usage of the electronic device 2 increases one mA when the temperature of the CPU increases one degree. The weight factor varies when the component varies. For example, the weight factor is equal to "2" when the component is the screen. The weight factor of each component is calculated as following: (1) saving the power usage of the electronic device 2 and the parameters of the components into a list at each of a plurality of moments as shown in FIG. 3; (2) when a difference between the power usage of a first one of the moments and the power usage of a second one of the moments is greater than a predetermined value (for example, as shown in FIG. 3, the $6^{th}$ power usage of the electronic device 2 is 47 mA, the $5^{th}$ power usage of the electronic is 30 mA, and a difference between the $6^{th}$ power usage and the $5^{th}$ power usage is 17 mA which exceeds a predetermined value of 10 mA), marking the power usage and the parameters of the second moment as error values and removing the error values from the list, wherein the second moment immediately follows the first moment; and (3) calculating the weight factor of each component according to the list using a multivariate nonlinear regression algorithm and a recursive algorithm. In one embodiment, the determination module converts the power usage and the parameters of each moment in the list into a data set as a following format: (y; $x_1, x_2, x_3, x_4, \ldots, x_M$), where y is the power usage of the moment corresponding to the data set, M is the number of the components, $x_j$ is the parameter of the $1^{st}$ component, $x_M$ is the parameter of the $M^{th}$ component. For example, the parameters in the list of FIG. 3 are converted into a data set as shown in FIG. 4. The $6^{th}$ data set is marked as error values and deleted from the list as shown in FIG. 4. The power usage of the electronic device 2 is abnormal when the calculated weight factor of each component is greater than a predetermined weight factor of the same component. For example, if the calculated weight factor of the CPU is equal to "1.2", and the predetermined weight factor of the CPU is "1", the power usage of the electronic device 2 is determined to be abnormal.

Additionally, the power usage of the electronic device 2 is abnormal when at least one of applications which are included in a white list runs in the electronic device 2 within the $N^{th}$ period. In detail, the white list is predetermined by a user, for example, the white list includes a battery detection application. If the battery detection application runs in the electronic device 2 within the $N^{th}$ period, the power usage of the electronic device 2 is determined to be abnormal.

At block 304, a recording module records information of applications which run in the electronic device 2 within the $N^{th}$ period. The information of applications include names of the applications, the running time of each application or the like.

Figure 5:
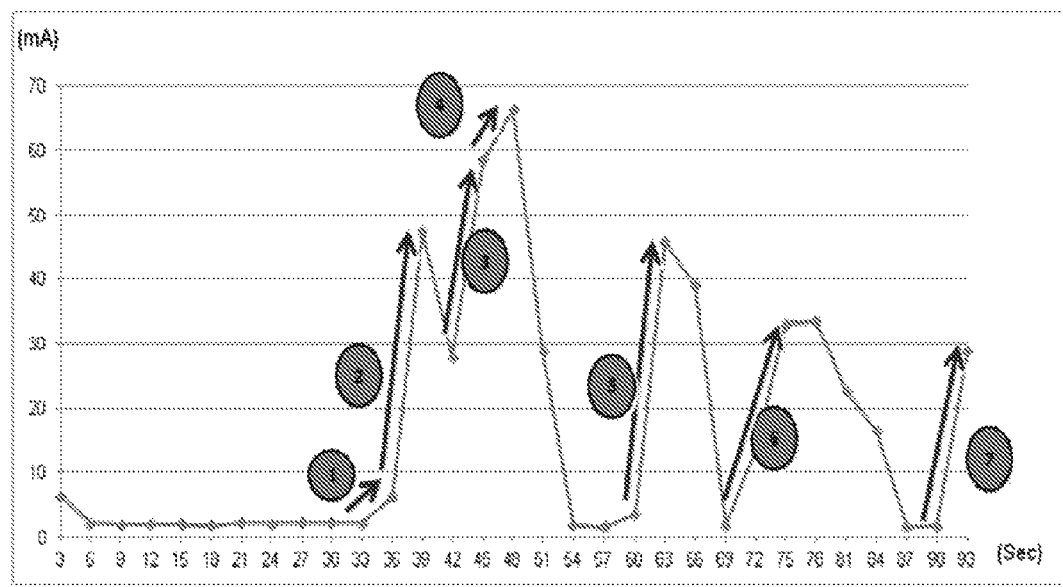
FIG. 5 shows a diagrammatic view of an example of a report of the power usage of the electronic device.

At block 305, a generation module saves the power usage of the electronic device 2 within the $N^{th}$ period into a report. The report includes the power usage of the electronic device 2 within each period. Each power usage of the electronic device 2 is a dot in the report as shown in FIG. 5, for example, each two dots are connected using a line. Furthermore, the line can be further marked with a specific number as shown in FIG. 5, such as ①, ②, ③, ④, ⑤, ⑥, ⑦ in the report of the FIG. 5, which indicates the power usage of the electronic device 2 is abnormal.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. An electronic device comprising:
   at least one processor; and
   a storage device that stores one or more programs, which when executed by the at least one processor, cause the at least one processor to:
   obtain parameters of components of the electronic device and a power usage of the electronic device within a predetermined $N^{th}$ period, wherein N is a positive integer;
   determine if the power usage of the electronic device is normal according to the parameters of components of the electronic device within the $N^{th}$ period when a difference between the power usage of the electronic device within the $N^{th}$ period and a power usage of the electronic device within a $(N-1)^{th}$ period exceeds a threshold value; and
   record, when the power usage of the electronic device is abnormal, information of applications running on the electronic device within the $N^{th}$ period;
   wherein each of the components of the electronic device is assigned with a weight factor for determining whether the power usage of the electronic device is normal or abnormal;
   wherein the weight factor of each of the components is calculated by performing operations comprising:
   saving the power usage of the electronic device and the parameters of the components into a list at each of a plurality of moments; and
   when a difference between the power usage of a first one of the moments and the power usage of a second one of the moments is greater than a predetermined value, marking the power usage and the parameters of the second moment as error values and removing the error values from the list, wherein the second moment immediately follows the first moment; and
   calculating the weight factor of each of the components according to the list using a multivariate nonlinear regression algorithm and a recursive algorithm.

2. The electronic device of claim 1, wherein the parameters of components of the electronic device comprises at least one of a temperature value and a CPU usage of the electronic device, a running time of a screen of the electronic device, a throughput of a WIFI device of the electronic device, a change count of the WIFI device of the electronic device, a throughput of a communication device of the electronic device, and a change count of the communication device of the electronic device.

3. The electronic device of claim 2, wherein the power usage of the electronic device is abnormal when Br is less than Pr, wherein Br is a difference between the running time of the screen within the $N^{th}$ period and the running time of the screen within the $(N-1)^{th}$ period, and Pr is a difference between the power usage of the electronic device within the $N^{th}$ period and the power usage of the electronic device within the $(N-1)^{th}$ period.

4. The electronic device of claim 1, wherein the power usage of the electronic device is normal when the calculated weight factor of each of the components is less than a predetermined weight factor of the same component.

5. A computer-based method for detecting power usages of an electronic device, the method comprising:
   obtaining parameters of components of the electronic device and a power usage of the electronic device within a predetermined $N^{th}$ period, wherein N is a positive integer;
   determining if the power usage of the electronic device is normal according to the parameters of components of the electronic device within the $N^{th}$ period when a difference between the power usage of the electronic device within the $N^{th}$ period and a power usage of the electronic device within a $(N-1)^{th}$ period exceeds a threshold value; and
   recording, when the power usage of the electronic device is abnormal, information of applications running on the electronic device within the $N^{th}$ period;
   wherein each of the components of the electronic device is assigned with a weight factor for determining whether the power usage of the electronic device is normal or abnormal;
   wherein the weight factor of each of the components is calculated by performing operations comprising:
   saving the power usage of the electronic device and the parameters of the components into a list at each of a plurality of moments;
   when a difference between the power usage of a first one of the moments and the power usage of a second one of the moments is greater than a predetermined value, marking the power usage and the parameters of the second moment as error values and removing the error values from the list, wherein the second moment immediately follows the first moment; and
   calculating the weight factor of each of the components according to the list using a multivariate nonlinear regression algorithm and a recursive algorithm.

6. The method of claim 5, wherein the parameters of components of the electronic device comprises at least one of a temperature value and a CPU usage of the electronic device, a running time of a screen of the electronic device, a throughput of a WIFI device of the electronic device, a change count of the WIFI device of the electronic device, a throughput of a communication device of the electronic device, and a change count of the communication device of the electronic device.

7. The method of claim 6, wherein the power usage of the electronic device is abnormal when Br is less than Pr, wherein Br is a difference between the running time of the screen within the $N^{th}$ period and the running time of the screen within the $(N-1)^{th}$ period, and Pr is the difference between the power usage of the electronic device within the $N^{th}$ period and the power usage of the electronic device within the $(N-1)^{th}$ period.

8. The method of claim 5, wherein the power usage of the electronic device is normal when the calculated weight factor of each of the components is less than a predetermined weight factor of the same component.

9. The method of claim 5, further comprising:
saving the power usage of the electronic device within the $N^{th}$ period into a report.

10. A non-transitory computer-readable medium having stored thereon instructions that, when executed by at least one processor of an electronic device, causing the processor to perform a method for detecting power usages of the electronic device, the method comprising:
obtaining parameters of components of the electronic device and a power usage of the electronic device within a predetermined $N^{th}$ period, wherein N is a positive integer;
determining if the power usage of the electronic device is normal according to the parameters of components of the electronic device within the $N^{th}$ period when a difference between the power usage of the electronic device within the $N^{th}$ period and a power usage of the electronic device within a $(N-1)^{th}$ period exceeds a threshold value; and
recording, when the power usage of the electronic device is abnormal, information of applications running on the electronic device within the $N^{th}$ period;
wherein each of the components of the electronic device is assigned with a weight factor for determining whether the power usage of the electronic device is normal or abnormal;
wherein the weight factor of each of the components is calculated by performing operations comprising:
saving the power usage of the electronic device and the parameters of the components into a list at each of a plurality of moments;
when a difference between the power usage of a first one of the moments and the power usage of a second one of the moments is greater than a predetermined value, marking the power usage and the parameters of the second moment as error values and removing the error values from the list, wherein the second moment immediately follows the first moment; and
calculating the weight factor of each of the components according to the list using a multivariate nonlinear regression algorithm and a recursive algorithm.

11. The non-transitory computer-readable medium of claim 10, wherein the parameters of components of the electronic device comprises at least one of a temperature value and a CPU usage of the electronic device, a running time of a screen of the electronic device, a throughput of a WIFI device of the electronic device, a change count of the WIFI device of the electronic device, a throughput of a communication device of the electronic device, and a change count of the communication device of the electronic device.

12. The non-transitory computer-readable medium of claim 11, wherein the power usage of the electronic device is abnormal when Br is less than Pr, wherein Br is a difference between the running time of the screen within the $N^{th}$ period and the running time of the screen within the $(N-1)^{th}$ period, and Pr is the difference between the power usage of the electronic device within the $N^{th}$ period and the power usage of the electronic device within the $(N-1)^{th}$ period.

13. The non-transitory computer-readable medium of claim 10, wherein the power usage of the electronic device is normal when the calculated weight factor of each of the components is less than a predetermined weight factor of the same component.

14. The non-transitory computer-readable medium of claim 9, wherein the method further comprises:
saving the power usage of the electronic device within the $N^{th}$ period into a report.

* * * * *